United States Patent
Li et al.

(10) Patent No.: US 8,184,594 B2
(45) Date of Patent: May 22, 2012

(54) HANDOVER PROCESSING METHOD, ENB AND NETWORK COMMUNICATION SYSTEM THEREOF

(75) Inventors: Mingju Li, Beijing (CN); Lei Du, Beijing (CN); Lan Chen, Beijing (CN)

(73) Assignee: NTT Docomo, Inc., Tokyo (JP)

( * ) Notice: Subject to any disclaimer, the term of this patent is extended or adjusted under 35 U.S.C. 154(b) by 379 days.

(21) Appl. No.: 12/506,936

(22) Filed: Jul. 21, 2009

(65) Prior Publication Data
US 2010/0027507 A1    Feb. 4, 2010

(30) Foreign Application Priority Data
Jul. 22, 2008   (CN) .......................... 2008 1 0133239

(51) Int. Cl.
*H04W 36/24* (2009.01)
*H04W 28/26* (2009.01)
(52) U.S. Cl. .................... 370/331; 370/329; 455/438
(58) Field of Classification Search .................. 370/331, 370/332–334, 338, 328–330; 455/436, 437, 455/438–439
See application file for complete search history.

(56) References Cited

U.S. PATENT DOCUMENTS

| | | | | |
|---|---|---|---|---|
| 6,879,830 B1* | 4/2005 | Vollmer et al. | ............... | 455/442 |
| 7,224,972 B2* | 5/2007 | Pischella | ............... | 455/436 |
| 8,023,467 B2* | 9/2011 | Wu et al. | ............... | 370/331 |
| 8,121,094 B2* | 2/2012 | Park et al. | ............... | 370/332 |
| 2005/0250498 A1* | 11/2005 | Lim et al. | ............... | 455/436 |
| 2007/0091849 A1* | 4/2007 | Park et al. | ............... | 370/331 |
| 2007/0286125 A1* | 12/2007 | Lee et al. | ............... | 370/331 |
| 2008/0182579 A1* | 7/2008 | Wang et al. | ............... | 455/436 |
| 2008/0233323 A1* | 9/2008 | Cheng et al. | ............... | 428/36.91 |
| 2009/0029706 A1* | 1/2009 | Prakash et al. | ............... | 455/436 |
| 2009/0046578 A1* | 2/2009 | Aydin et al. | ............... | 370/221 |
| 2010/0178920 A1* | 7/2010 | Kitazoe et al. | ............... | 455/436 |
| 2010/0189074 A1* | 7/2010 | Liao | ............... | 370/331 |

* cited by examiner

*Primary Examiner* — Kwang B Yao
*Assistant Examiner* — Candal Elpenord
(74) *Attorney, Agent, or Firm* — Blakely, Sokoloff, Taylor & Zafman LLP

(57) ABSTRACT

Embodiments of the present invention includes a handover processing method, a source eNB, a neighboring eNB and a network communication system. In one embodiment of the handover processing method, a source eNB selects a target eNB from neighboring eNBs that can accept a handover request from a mobile terminal, and notifies a selection result to the mobile terminal; if handover information corresponding to the mobile terminal is received by an neighboring eNB that can accept the handover request of the mobile terminal within a preset handover waiting time, the neighboring eNB determines that it is a target eNB and cooperates with the mobile terminal to perform a handover; otherwise, the neighboring eNB determines that it is a prepared eNB and reduces its resources reserved for the mobile terminal. The present invention can effectively improve the successful handover probability.

19 Claims, 6 Drawing Sheets

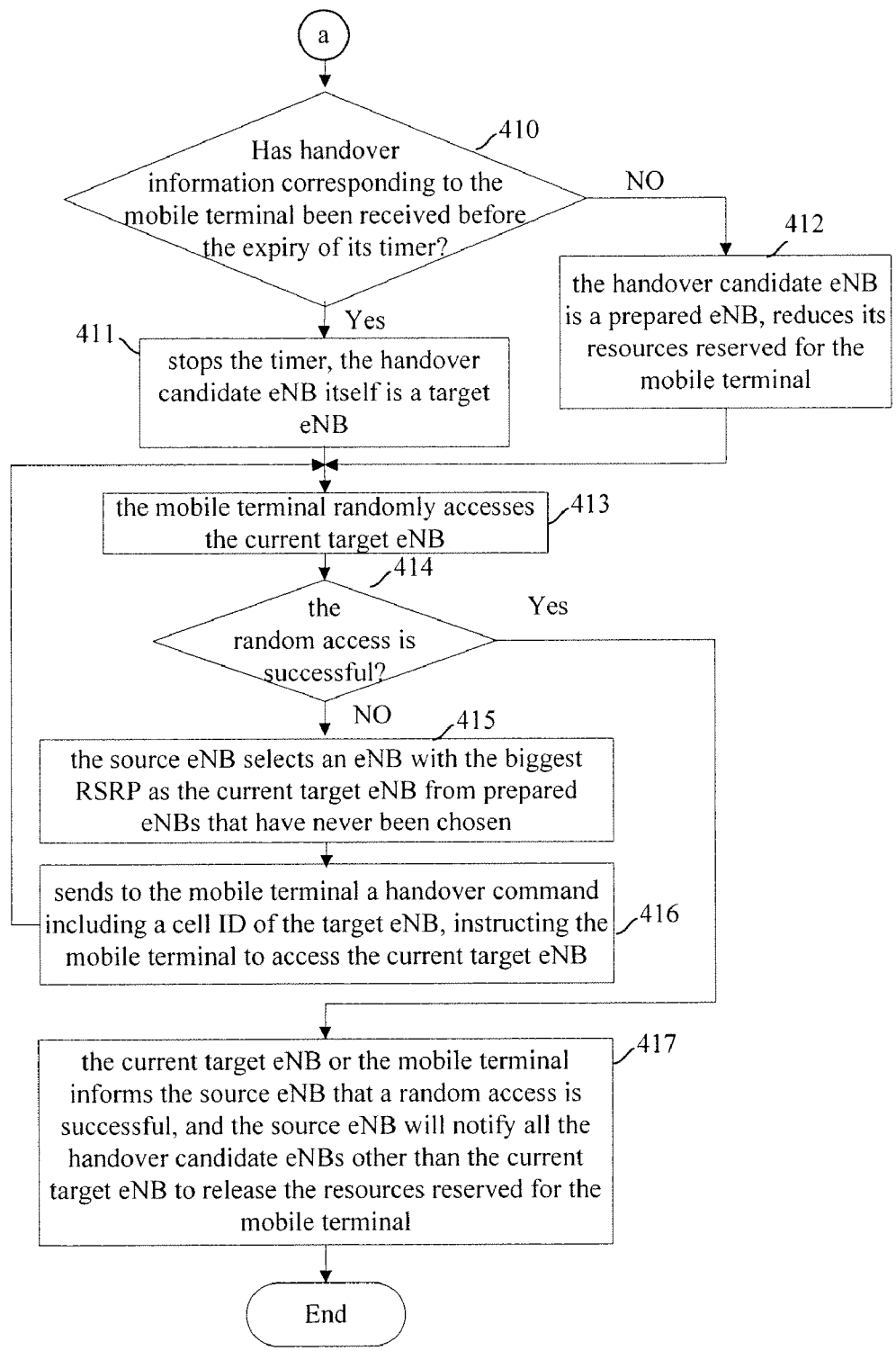
Figure 4 (Contd.)

HANDOVER PROCESSING METHOD, ENB AND NETWORK COMMUNICATION SYSTEM THEREOF

PRIORITY

The present application claims priority to and incorporates by reference the entire contents of Chinese patent application, No. 200810133239.0, filed in China on Jul. 22, 2008.

FIELD OF THE INVENTION

The present invention relates to mobile communication handover technology, and particularly relates to a handover processing method, a source eNB, a neighboring eNB and a network communication system in mobile communications.

BACKGROUND OF THE INVENTION

In mobile communications system, when a mobile terminal, such as a UE in a Long-term evolution (LTE) system, leaves a source cell and enters another cell, the signals it receives from the source cell become weak increasingly, and the signals from the inbound cell the mobile terminal is entering will become more and more strong. In order to ensure the communication quality of UE and realize the mobility management in a connected status, a handover from the source eNB to an eNB with stronger signals can be performed for the mobile terminal; that is, the mobile terminal is switched from a source cell to a target cell. Usually, an eNB for providing resources for a mobile terminal before handover is called a source eNB, and an eNB for providing sources for a mobile terminal after handover is called a target eNB.

Various types of mobile communications system can use their handover rules to realize handover for mobile terminals, respectively. Taking the Long-term evolution (LTE) system as an example, the handover of the mobile terminal includes: the source eNB selects a target eNB from all neighboring eNBs in accordance with Reference Signal Received Power (RSRP), Reference Signal Received Quality (RSRQ) or other received signal parameters etc., sends a handover request to the selected target eNB, and informs the mobile terminal for handover upon receipt of a handover request acknowledge signal fed back by the target eNB in the target cell. Then, the mobile terminal establishes a connection with the target eNB through a random access mode. However, if the mobile terminal does not have service authority in the target eNB or the load of the target eNB is too heavy, the target eNB will not feed back a handover request acknowledge signal to the source eNB, and the handover is failed. In addition, if a plurality of mobile terminals initiate random access to the target eNB at the same time, that is a random access collision occurs, or system information of the target eNB stored in the mobile terminal becomes invalid, the random access initiated by the mobile terminal to the target eNB fails, which would lead to a handover failure. In order to recover the handover as soon as possible for enabling the mobile terminal to continue enjoying the service, a handover processing approach based on prepared eNBs is put forward in the LTE. In this approach, after handover fails, the mobile terminal selects a suitable cell, and establishes a Radio Resource Control (RRC) connection with the eNB of the suitable cell. If the eNB of the suitable cell is one of a source eNB, a target eNB or a prepared eNB, the RRC connection can be successfully established, and the handover failure recovery is in turn successful. If the eNB of the suitable cell is none of the above mentioned three types of eNBs, it means that the context relation information of the mobile terminal does not exist in the eNB of the suitable cell, and then the RRC connection establishment is failed and the handover failure can not be recovered.

FIG. 1 is a flowchart illustrating a handover processing method in an existing LTE. As shown in FIG. 1, the method includes:

In step 101, a source eNB issues measurement configuration information to a mobile terminal, and the mobile terminal reports to the source eNB a measured RSRP of neighboring cells.

In this step, the measurement configuration information issued by the source eNB to the mobile terminal includes at least measurement objects, measurement report configuration, wherein the measurement objects are neighboring cells of the cell the source eNB corresponds to, which can be of various types and not be limited to such as working carrier frequency and wireless access technology. The measurement report configuration refers to a condition that the mobile terminal reports a measurement report. Such as if the measured RSRP of an neighboring cell is higher than a predefined threshold, the mobile terminal will reports the measured RSRP of the neighboring cell to the source eNB.

The mobile terminal measures the measurement objects in accordance with the received measurement configuration information, and reports to the source eNB RSRPs corresponding to the cells who meet the measurement report configuration, i.e., the measurement report cells. Here, the mobile terminal can also measure parameters such as RSRQ of a measurement object, and report the measured RSRQ.

In step 102, the source eNB makes a handover decision, and performs step 103 when it is determined that a handover trigger condition is currently met.

For example, when the reported cell is an intra frequency cell, if one of the following scenarios appears, that is the RSRP of the source cell is lower than a predefined threshold 1 and the RSRP of an neighboring cell is higher than a predefined threshold 2, and the RSRP of the neighboring cell is offset higher than that of the source cell, the source eNB can determine that a handover trigger condition is met in the current scenario, and then continue to perform a handover in subsequent steps. If the source eNB determines that a handover condition is not satisfied in the current scenario, the procedure is ended. When the reported cell is an inter frequency cell, the source eNB further needs to consider inter frequency hysteresis in the handover decision process.

In steps 103-104, the source eNB sends a handover request to each of the neighboring eNBs of the reported cell, any of the neighboring eNBs receiving the handover request feeds back a handover request acknowledge signal when determining that the neighboring eNB can be accessed by the mobile terminal, and carries out a handover preparation.

When sending a handover request to each of the neighboring eNBs, the source eNB may carry context relation information of a mobile terminal into the handover request, such as user service class and user ID corresponding to the mobile terminal.

After receiving the handover request from the source eNB, a neighboring eNB can make an access decision according to admission control criteria such as service authority and load. If it is determined that the handover request of the mobile terminal is acceptable, a handover preparation is carried out via the following ways such as allocating an idle random access preamble and resource data resources for the mobile terminal.

In step 105, the source eNB will store in itself information of neighboring eNBs corresponding to the handover request acknowledge signals as information of prepared eNBs, select a target eNB from them, and send a handover command including target eNB information to the mobile terminal.

The information of prepared eNBs stored in the source eNB may be a cell ID corresponding to the eNB. Thereafter, the source eNB selects a target eNB from the prepared eNBs based on a principle of the largest RSRP or a principle of user preferences, for example, selecting prepared eNB 1 as a target eNB.

In step 106, a random access initiated by the mobile terminal to the target eNB is failed.

In step 107, the mobile terminal selects a suitable cell.

In this step, the mobile terminal performs cell selection by use of such as measurement. As a result of a failure of the mobile terminal to access the target eNB in the foregoing step 106, the mobile terminal will not update its own configuration information into configuration information corresponding to the target eNB, but retain the configuration information previously set by the source eNB for the mobile terminal.

In step 108, the mobile terminal establishes an RRC connection with an eNB of a selected suitable cell, and the handover process is ended after the RRC connection is successful established.

When the eNB corresponding to the suitable cell selected by the mobile terminal is a prepared eNB, it is more likely that the eNB has already stored context relation information of the mobile terminal, and there is a higher probability of random access success. Therefore, an ideal situation is the prepared eNB is selected as a suitable cell eNB, for example, prepared eNB 2 is used as a target eNB at this time.

Then, an existing handover processing procedure based on prepared eNBs is completed.

During the above-mentioned handover processing procedure based on prepared eNBs, the source eNB issues a handover request to a number of neighboring eNBs at the same time in the early stage. When determining via an admission control that the handover request of the mobile terminal is acceptable, a neighboring eNB having received the handover request feeds back a handover request acknowledge signal to the source eNB. Also, a neighboring eNB will reserve part of its resources for the mobile terminal, and the reserved resources will be in real use when the prepared eNB is selected by the mobile terminal as a target eNB. If a neighboring eNB is waiting for handover of multiple mobile terminals at the same time, that is resources are reserved for each of the mobile terminals, the available resources of the neighboring eNB may be reduced. Then, when any new handover request arises, the neighboring eNB will not be able to provide adequate resources which may result in an admission control failure, and also result in lower successful handover probability of the mobile terminal. On the other hand, the prepared eNB can not learn whether the mobile terminal has successfully switched to the target eNB, and the target eNB also does not inform the prepared eNB to release the reserved resources. If the prepared eNB unilaterally releases the reserved resources corresponding to the mobile terminal, the mobile terminal will not be able to handover to the prepared eNB any longer, which may also affect the successful handover probability of the mobile terminal.

SUMMARY OF THE INVENTION

A handover processing method, ENB and Network Communication System thereof are described. In one embodiment, the method comprises selecting, by a source eNB, a target eNB from neighboring eNBs that can accept a handover request from a mobile terminal, and notifying a selection result to the mobile terminal; if handover information corresponding to the mobile terminal is received by an neighboring eNB that can accept the handover request of the mobile terminal within a preset handover waiting time, determining, by the neighboring eNB, that it is a target eNB and cooperating with the mobile terminal to perform a handover; and otherwise, determining it is a prepared eNB by the neighboring eNB and reducing its resources reserved for the mobile terminal.

DESCRIPTION OF DRAWINGS

Exemplary embodiments will be described in detail in accordance with drawings, thus characteristics and merit of the present invention will be illustrated more clearly to those skilled in the art. In the drawings.

DETAILED DESCRIPTION OF THE INVENTION

Figure 1:
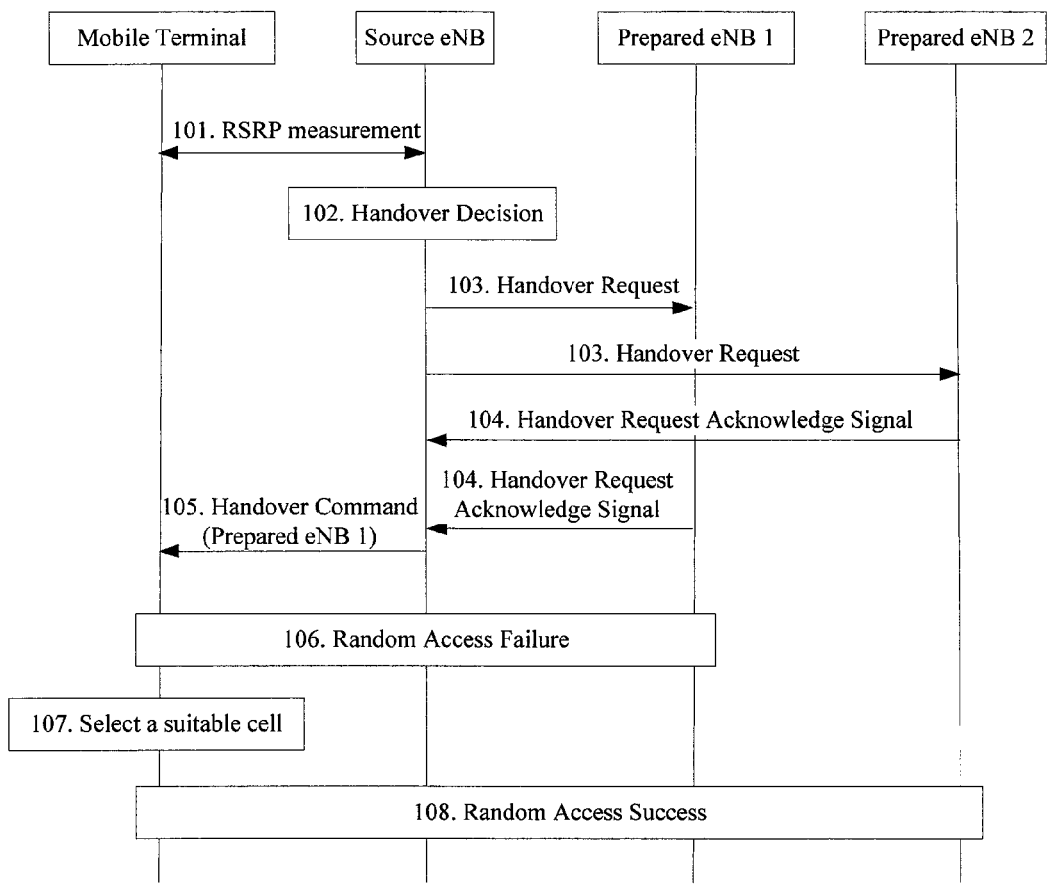
FIG. 1 is a flowchart illustrating a handover processing method in an existing LTE.

A handover processing method is provided by the present invention to improve the successful handover probability. The handover processing method according to an embodiment of the present invention includes: selecting, by a source eNB, a target eNB from neighboring eNBs that can accept a handover request from a mobile terminal, and notifying a selection result to the mobile terminal; if handover information corresponding to the mobile terminal is received by a neighboring eNB that can accept the handover request of the mobile terminal within a preset handover waiting time, determining, by the neighboring eNB, that it is a target eNB and cooperating with the mobile terminal to perform a handover; and otherwise, determining itself as a prepared eNB by the neighboring eNB and reducing its resources reserved for the mobile terminal.

Preferably, the handover information corresponding to the mobile terminal includes any one of the following: a dedicated random access preamble sent by the mobile terminal, a message from the source eNB for indicating that an eNB is selected as the target eNB, and buffered data of the mobile terminal forwarded by the source eNB.

Preferably, the method further includes: setting a resource reuse factor according to handover failure probability and/or current cell load of the prepared eNB, before reducing its resources reserved for the mobile terminal; wherein reducing its resources reserved for the mobile terminal includes: adjusting the resources reserved for the mobile terminal to an amount equal to a quotient obtained by dividing original reserved resources by the resource reuse factor.

Preferably, the method further includes: setting, by the source eNB, the neighboring eNBs that can accept the handover request of the mobile terminal as a handover candidate eNBs, and storing information of the handover candidate eNBs, before selecting a target eNB from neighboring eNBs that can accept a handover request of a mobile terminal; and after cooperating with the mobile terminal to perform a handover, a1) determining whether the handover of the mobile terminal is successful, and if so, ending the handover processing procedure; otherwise, reselecting, by the source eNB, a target eNB from the handover candidate eNBs that have not yet been selected in accordance with the stored information of the handover candidate eNBs, informing the mobile terminal, and performing step a2; a2) initiating a random access to the reselected target eNB by the mobile terminal, and returning to step a1.

Preferably, selecting a target eNB includes: selecting, by the source eNB, an optimal eNB as the target eNB in accordance with received signal parameters of the neighboring eNB and/or user preferences.

Preferably, the method further includes: before the source eNB selects a target eNB from neighboring eNBs that can accept a handover request of a mobile terminal, sending, by the source eNB, the handover request to at least one neighboring eNB; after determining that the handover request of the mobile terminal is acceptable according to the handover request and resources of the neighboring eNB, resource, by an neighboring eNB that has received the handover request, resources for the mobile terminal, and sending out a handover request acknowledge signal to the source eNB; taking, by the source eNB, the neighboring eNB corresponding to the handover request acknowledge signal as an neighboring eNB that can accept the handover request of the mobile terminal.

Preferably, the method further includes: presetting a corresponding relationship between a service class of mobile terminal and a maximum number of prepared eNBs; and before sending a handover request to at least one neighboring eNB, b1) arranging, by the source eNB, the neighboring eNBs in a descending order in accordance with received signal parameters, and setting the number of selected neighboring eNBs as 0; b2) when determining that the mobile terminal needs to handover and determining that the source eNB and the neighboring eNB with the best received signal parameters meet a handover trigger condition, selecting the neighboring eNB with the best received signal parameters, adding the number of selected neighboring eNBs by 1, and performing step b3; b3) determining whether the number of selected neighboring eNBs is less than the maximum number of prepared eNBs plus 1, and if yes, performing step b4; otherwise, performing the step of sending the handover request to at least one neighboring eNB; b4) determining whether all the neighboring eNBs, whose received signal parameters have been obtained by the source eNB, have been processed, and if so, performing the step of sending the handover request to at least one neighboring eNB; otherwise, performing step b5; b5) taking a next neighboring eNB as the current neighboring eNB, and determining whether a handover trigger condition is met by the current neighboring eNB, and if yes, selecting the neighboring eNB, adding the number of selected neighboring eNBs by 1, and returning to step b3; otherwise, returning to step b4; wherein sending the handover request to at least one neighboring eNB includes: sending handover requests to the selected neighboring eNBs.

Preferably, the method further includes: after it is determined by the source eNB that the handover of the mobile terminal is successful, releasing, by all the handover prepared eNBs other than the target eNB, the resources of their own reserved for the mobile terminal.

A source eNB is provided by the present invention to improve the successful handover probability.

The source eNB according to an embodiment of the present invention includes a communication unit and a decision making unit, wherein the communication unit is adapted to interact with one or more neighboring eNBs, inform information of the neighboring eNBs that can accept a handover request of the mobile terminal to the decision making unit, and send the target eNB information obtained from the decision making unit to the mobile terminal; and the decision making unit is adapted to select a target eNB from the neighboring eNBs that can accept the handover request of the mobile terminal, and inform information of the target eNB to the communication unit.

Preferably, the source eNB further includes a storage unit, adapted to store the information of handover candidate eNBs, wherein the decision making unit comprises: a control module and a selection module, wherein the control module is adapted to receive handover request acknowledge signals of the neighboring eNBs forwarded by the communication unit, and take the neighboring eNBs corresponding to the handover request acknowledge signals as handover candidate eNBs, send information of the handover candidate eNBs to the storage unit, and inform the selection module to select a target eNB; receive the information of the target eNB from the selection module, and instruct the communication unit to send the information of the target eNB to the mobile terminal; inform the selection module to reselect a target eNB after determining a handover failure of the mobile terminal; and the selection module is adapted to read, after receiving from the decision making unit a notification for selecting a target eNB, the information of the handover candidate eNBs from the storage unit, select a target eNB from the handover candidate eNBs according to received signal parameters and/or user preferences; after receiving from the decision making unit a notification for reselecting a target eNB, reselect a target eNB from the handover candidate eNBs that have never been selected based on received signal parameters and/or user preferences; send the information of the target eNB to the control module after the selection of the target eNB.

Preferably, the control module is further adapted to receive dedicated random access preambles allocated by the neighboring eNBs for the mobile terminal and forwarded by the communication unit, as one of the information of the handover candidate eNBs.

Preferably, the storage unit is further adapted to buffer communication data sent or to be received by the mobile terminal; and the control module is further adapted to read the communication data from the storage unit after the target eNB has been selected, and instruct the communication unit to send the communication data to the target eNB; the communication unit is further adapted to receive the communication data from the control module, and send the communication data to the target eNB.

Preferably, the control module is further adapted to generate, after the target eNB is selected by the selection module, a message for indicating that an eNB is selected as the target eNB, and send the message to the communication unit; and the communication unit is further adapted to send the message to the target eNB.

Preferably, the control module is further adapted to generate measurement configuration information, instruct the communication unit to issue the measurement configuration information to the mobile terminal, and receive from the communication unit the received signal parameters of the neighboring eNBs reported by the mobile terminal; make a handover decision in accordance with the received signal parameters of the neighboring eNBs, determine that the mobile terminal needs to handover when a handover trigger condition is met, generate the handover request for at least one neighboring eNB and instruct the communication unit to send the handover request to the at least one neighboring eNB.

Preferably, the source eNB further includes a parameter setting unit, adapted to receive from the control module service class information of the mobile terminal, read from the storage unit corresponding relationships between service classes and maximum numbers of prepared eNBs, determine the maximum number of prepared eNBs corresponding to the mobile terminal, and send the maximum number of prepared eNBs to the control module; wherein the storage unit is further adapted to store the preset corresponding relationships between service classes and maximum numbers of prepared eNBs as well as the maximum number of prepared eNBs corresponding to the mobile terminal; and the control module is further adapted to determine the service class information of the mobile terminal, receive the maximum number of prepared eNBs corresponding to the mobile terminal from the parameter setting unit, and inform the communication unit to send the handover request to neighboring eNBs with a number of the maximum number of prepared eNBs+1.

Preferably, the control module is further adapted to generate a notification of releasing reserved resources after determining the handover of the mobile terminal is successful, and instruct the communication unit to send the notification to the handover candidate eNBs other than the target eNB; and the communication unit is further adapted to inform, under the direction of the control unit, the handover candidate eNBs other than the target eNB to release the resources reserved for the mobile terminal.

A neighboring eNB is also provided by the present invention to improve the successful handover probability. The neighboring eNB according to another embodiment of the present invention, comprising: a communication unit, a timer unit and a decision making unit; wherein the communication unit is adapted for receiving from the external handover information corresponding to a mobile terminal; the timer unit is adapted for timing in accordance with a preset handover waiting time, and informing the decision making unit after the expiry of the timer; the decision making unit is adapted for determining whether the neighboring eNB the unit locates has received handover information corresponding to the mobile terminal within the handover waiting time, and if so, determining that the neighboring eNB is a target eNB, and informing the communication unit to cooperate with the mobile terminal for performing a handover to the neighboring eNB; otherwise, determining that the neighboring eNB is a prepared eNB, and reducing the amount of resources reserved for the mobile terminal.

Preferably, the decision making unit comprises a control module and a resource management module; wherein the control module is adapted to inform, after determining that the handover request of the mobile terminal is acceptable, the resource management module to reserve resources for the mobile terminal, instruct the communication unit to send a handover request acknowledge signal to the source eNB, and instruct the timer unit to start a timer corresponding to the handover request; if the handover information corresponding to the mobile terminal has been received by the control module before the expiry of the timer corresponding to the handover request, determining that the neighboring eNB the control unit locates is a target eNB, and informing the communication unit to cooperate with the mobile terminal for performing a handover; otherwise, determining the neighboring eNB the control unit locates is a prepared eNB, and notifying the resource management module to reduce the resources reserved for the mobile terminal; and the resource management module is adapted to, under the notification of the control module, reserve resources for the mobile terminal as well as reduce the amount of resources reserved for the mobile terminal.

Preferably, the neighboring eNB further includes a load calculation unit, adapted to calculate current cell load of the neighboring eNB the unit locates, and send the calculation result to the control module; wherein the communication unit is further adapted to receive handover failure probability from the external, and forward it to the control module; the control module is further adapted to determine a resource reuse factor in accordance with the received current cell load and handover failure probability, and send it to the resource management module; the resource management module is adapted to adjust, upon receipt of the notification for reducing the reserved resources from the control module, the resources reserved for the mobile terminal to an amount equal to a quotient obtained by dividing the original reserved resources by the resource reuse factor.

Preferably, the communication unit is further adapted to receive the handover request from the source eNB, and forward the handover request to the control module in the decision making unit; and the control module is further adapted to receive the handover request forwarded by the communication unit, obtain the amount of resources of the neighboring eNB the unit locates from the resource management module, and determine whether to accept the handover request of the mobile terminal in accordance with the handover request and the obtained amount of resources of the neighboring eNB.

Preferably, the control module is further adapted to allocate, after determining the acceptance of the handover request of the mobile terminal, a dedicated random access preamble for the mobile terminal, and send it to the communication unit; and the communication unit is adapted to carry the dedicated random access preamble into the handover request acknowledge signal, and send the signal to the source eNB.

Preferably, wherein the control module is further adapted to instruct, after determining that the neighboring eNB it locates is a target eNB, the communication unit to inform the source eNB of a random access success if the mobile terminal has successfully got access to the neighboring eNB.

Preferably, the communication unit is further adapted to receive from the source eNB a notification for releasing the resources reserved for the mobile terminal, and forward it to the decision making unit in the control module; and the control module is adapted to inform the resource management module to release the resources reserved for the mobile terminal.

A network communication system is further provided by the present invention to improve the successful handover probability. The network communication system according to still another embodiment of the present invention includes: a source eNB and one or more neighboring eNBs, wherein the source eNB is adapted to select a target eNB from one or more neighboring eNBs that can accept a handover request of a mobile terminal, and notify the mobile terminal; and if receiving handover information corresponding to the mobile terminal within a preset handover waiting time, the neighboring eNB determining itself as a target eNB, and cooperating with the mobile terminal to perform a handover; otherwise, the neighboring eNB determining itself as a prepared eNB, and reducing the resources of its own reserved for the mobile terminal.

It can be seen from the above technical schemes, in the present invention, an neighboring eNB that can accept a handover request from a mobile terminal determines, according to whether handover information corresponding to the mobile terminal has been received during the preset handover waiting time, whether itself is a target eNB or prepared eNB for current handover of the mobile terminal. When it is a prepared eNB, the neighboring eNB may reduce the amount of resources reserved for the mobile terminal since the mobile terminal will not access the neighboring eNB at this time, in order to release some of the resources as reserved resources for other mobile terminals or as available resources in the cell. In this way, since the neighboring eNB can clearly differentiate its role for a handover and adjust allocation of resources according to its role acted in the handover, the allocation of resources becomes more reasonable. Even if the neighboring eNB acts as a prepared eNB for a number of mobile terminals at the same time, the reserved resources in the present invention are to a large extent less than resources reserved at a prepared eNB in the existing handover scheme, thereby effectively increasing the available resources in a cell, and significantly improving the success rate of mobile terminals for accessing the eNB, that is, improving the successful handover probability of the mobile terminals.

To make the purpose and technical solution of the present invention more clearly, the present invention is described hereinafter with reference to the following drawings and embodiments.

In the present invention, a handover waiting time is preset. Each eNB determines, according to feedback of handover information during the handover waiting time, whether the eNB itself is a target eNB or as a prepared eNB. If it is used as a prepared eNB, the eNB may reduce its resources reserved for mobile terminals.

Figure 2:
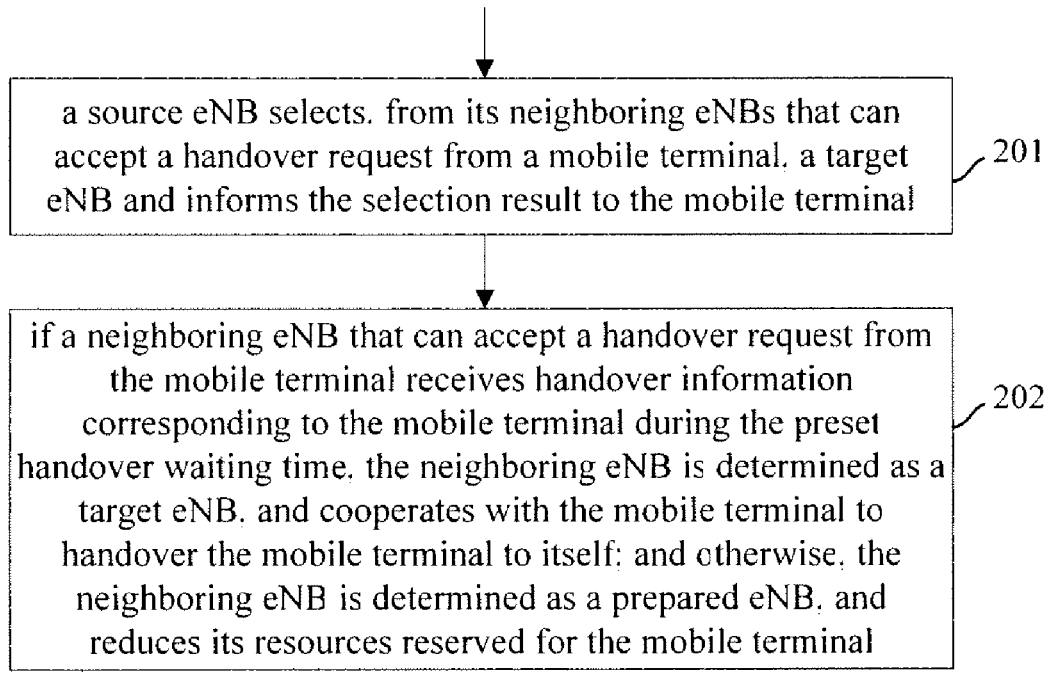
FIG. 2 illustrates an exemplary flowchart for handling handover in accordance with an embodiment of the present invention.

FIG. 2 illustrates an exemplary flowchart for handling handover in accordance with an embodiment of the present invention. As shown in FIG. 2, the method includes the following steps.

In step 201, a source eNB selects, from its neighboring eNBs that can accept a handover request sent from a mobile terminal, a target eNB, and informs the selection result to the mobile terminal.

In step 202, if a neighboring eNB that can accept a handover request from the mobile terminal receives handover information corresponding to the mobile terminal during the preset handover waiting time, the neighboring eNB is determined as a target eNB, and the neighboring eNB cooperates with the mobile terminal to handover the mobile terminal to itself. Otherwise, the neighboring eNB is determined to be a prepared eNB, and the neighboring eNB reduces its resources reserved for the mobile terminal.

The mobile terminal in the present invention refers to a mobile terminal which is determined by the source eNB to have a need for handover. The handover information can be a dedicated random access preamble from the mobile terminal, or a message from the source eNB for indicating that the neighboring eNB is selected as a target eNB, or can also be buffered data from the source eNB.

Figure 3:
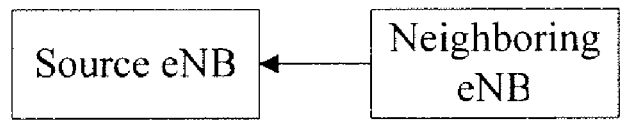
FIG. 3 is a diagram illustrating an exemplary structure of a network communication system in accordance with the present invention.

FIG. 3 is a diagram illustrating an exemplary structure of a network communication system in accordance with the present invention. As shown in FIG. 3, the network communication system includes: a source eNB and neighboring eNBs.

Here, a source eNB is adapted to select, from its neighboring eNBs that can accept a handover request sent from a mobile terminal, a target eNB, and inform the selection result to the mobile terminal. If a neighboring eNB receives handover information corresponding to the mobile terminal during the preset handover waiting time, the neighboring eNB determines itself as a target eNB, and cooperates with the mobile terminal to handover the mobile terminal to itself. Otherwise, the neighboring eNB determines itself as a prepared eNB, and reduces its resources reserved for the mobile terminal.

In the present invention, a neighboring eNB that can accept a handover request from a mobile terminal determines whether itself is a target eNB or prepared eNB for current handover of the mobile terminal based on that whether handover information corresponding to the mobile terminal has been received during the preset handover waiting time. If it is a prepared eNB, the neighboring eNB may reduce the amount of resources reserved for the mobile terminal since the mobile terminal will not access the neighboring eNB at this time. Thus some of the resources can be released and used as reserved resources for other mobile terminals or as available resources in a cell. In this way, since the neighboring eNB can clearly differentiate its role in a handover process and adjust the allocation of resources according to its role acted in the handover process, the allocation of resources becomes more reasonable. Even if the neighboring eNB acts as prepared eNBs for a number of mobile terminals at the same time, the reserved resources according to one embodiment of the present invention are to a large extent less than resources reserved by a prepared eNB in accordance with existing handover schemes, thereby effectively increasing the available resources in a cell, and significantly improving the success rate of mobile terminals for accessing the eNB, that is, improving the successful handover probability of the mobile terminals.

The scheme of handover processing in accordance with the present invention will be described in detail hereinafter.

In an embodiment of the present invention, a handover waiting timer is set at each of the neighboring eNBs, wherein the greatest amount of time of the handover waiting timer is a preset handover waiting time.

Figure 4:
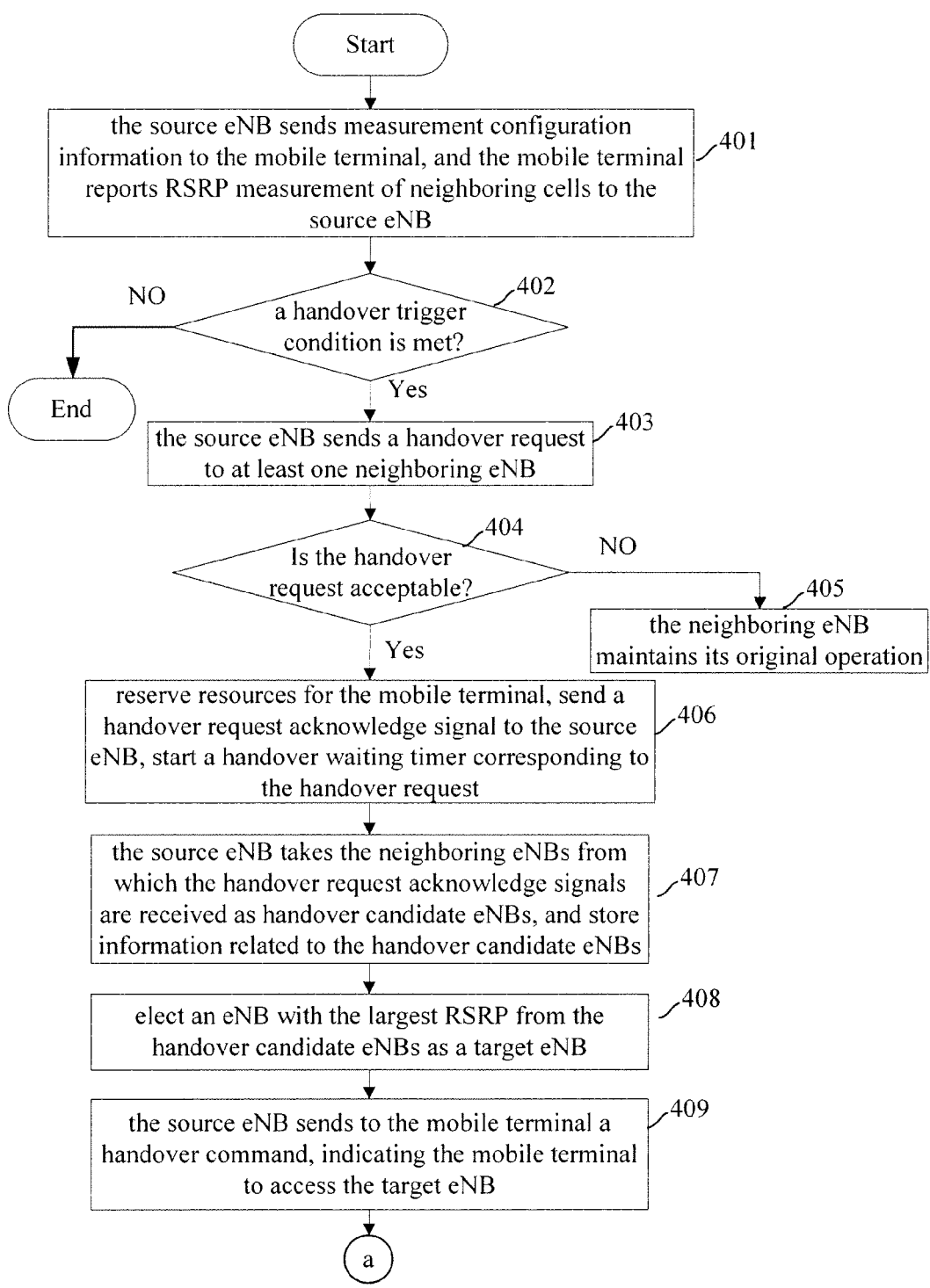
FIG. 4 illustrates a flowchart of a handover processing method in accordance with an embodiment of the present invention.

FIG. 4 illustrates a flowchart of a handover processing method in accordance with an embodiment of the present invention. As shown in FIG. 4, the method includes:

In steps 401-402, the source eNB sends measurement configuration information to the mobile terminal, and the mobile terminal reports Reference Signal Received Power (RSRP) measurement of neighboring cells to the source eNB, and then the source eNB makes a handover decision. If a handover trigger condition is currently met, it is determined that the mobile terminal needs to handover, and then step 403 is performed; otherwise, the handover procedure is ended.

Here, when making a handover decision, the source eNB can determine that the mobile terminal needs to handover as long as a received signal parameter is optimal, such as a neighboring cell with the largest RSRP satisfies a handover trigger condition.

In step 403, the source eNB sends a handover request to at least one neighboring eNB.

In this step, the handover request sent to a neighboring eNB by the source eNB can carry context relationship information of the mobile terminal, such as service class of a user and user ID corresponding to the mobile terminal, for enabling the neighboring eNB to determine the amount of resources needed by the mobile terminal according to the context relationship information in subsequent steps.

In steps 404-406, each of the neighboring eNBs have received the handover request determines whether the handover request is acceptable or not in accordance with its own resources. If the handover request is acceptable, the neighboring eNB reserves resources for the mobile terminal, sends a handover request acknowledge signal to the source eNB, starts a handover waiting timer corresponding to the handover request, and performs step 407; otherwise, the neighboring eNB maintains its original operation.

The neighboring eNB determines the amount of resources required by the mobile terminal in accordance with the context relationship information of the mobile terminal included in the handover request, for example, in accordance with a preset corresponding relationship between a service class of a user and the amount of resources required.

It is assumed that the amount of resources required by the mobile terminal is $C_n$. The neighboring eNB determines whether to accept the handover request, that is, whether the mobile terminal is acceptable to access the neighboring eNB, by comparing its available amount of resources $C_a$ at the time and the amount of resources required by the mobile terminal $C_n$. Specifically, when $C_a > C_n$, it means that the neighboring eNB can provide services for the mobile terminal at this time, then the handover request can be accepted.

It is assumed that a total amount of resources of a cell is C. Usually, the total amount of resources of a cell equals to a sum of the amount of resources consumed by connected mobile terminals $C_{used}$, the amount of resources reserved for handover $C_{ho}$ and the amount of available resources $C_a$. Since the total amount of resources of a cell C is a preset fixed value and the resources consumed by connected mobile terminals $C_{used}$ is known to the eNB, the available resources of the eNB at the current moment $C_a$ can be calculated according to the following Formula 1:

$$C_a = C - C_{used} - C_{ho} \quad \text{Formula 1}$$

Here, it is assumed that the current handover request is the $n_{th}$ handover request received by the eNB within a time interval, then the amount of resources reserved for handover $C_{ho}$ are a sum of resources reserved for the former (n−1) handover requests, that is, $$C_{ho} = \sum_{i=1}^{n-1} C_{ri} \quad \text{Formula 2}$$

wherein $C_{ri}$ denotes the amount of resources reserved for the $i_{th}$ handover request.

By combining Formula 1 and Formula 2, the amount of available resources of the eNB at the current moment $C_a$ can be obtained as follows:

$$C_a = C - C_{used} - \sum_{i=1}^{n-1} C_{ri} \quad \text{Formula 3}$$

wherein the above-mentioned n is a positive integer greater than 1, and i is a positive integer greater than or equal to 1.

So, a condition for accepting the current handover request is:

$$C_a = \left( C - C_{used} - \sum_{i=1}^{n-1} C_{ri} \right) > C_n.$$

In addition, the neighboring eNB can also determine whether to accept the handover request or not according to the proportion of the amount of available resources of the eNB $C_a$ in the total amount of resources in a cell C at the current moment. For example, when $C_a/C > \eta$, the handover request can be accepted, wherein $\eta$ is a resource occupation proportion threshold preset based on the load bearable by the neighboring eNB, and $\eta$ can be in a form of percentage, such as 20%.

No matter what way is adopted for determining whether to accept the handover request or not, as long as a handover request acknowledge signal is sent to the source eNB, the neighboring eNB will start its preset handover waiting timer for timing, in order to determine whether itself is a target eNB or a prepared eNB in subsequent steps.

Further, after it is determined that the handover request is accepted, in addition to a resources reservation for the mobile terminal, a dedicated random access preamble is also allocated to the mobile terminal, and sent to the source eNB via the handover request acknowledge signal.

In steps 407-408, the source eNB will take the neighboring eNBs from which the handover request acknowledge signals are received as handover candidate eNBs, and store information related to the handover candidate eNBs; and then select an eNB with the largest RSRP from the handover candidate eNBs as a target eNB.

Here, the information related to a handover candidate eNB may be such as a cell ID, system information, RSRP, a dedicated preamble of the mobile terminal in the handover candidate eNB. Also, the source eNB may arrange the handover candidate eNBs according to their RSRPs in a descending order, and take the handover candidate eNB with the largest RSRP as the current target eNB and take other handover candidate eNBs as prepared eNBs. The RSRP can be replaced by received signal parameters such as Reference Signal Received Quality (RSRQ).

Also, principles such as user preferences can be adopted in the embodiment for selecting an optimal eNB as the target eNB. Certainly, received signal parameters and user preferences can also be combined as the basis for selecting the target eNB.

In step 409, the source eNB sends to the mobile terminal a handover command carrying the cell ID of the target eNB, indicating the mobile terminal to access the target eNB.

If the handover request acknowledge signal previously received from the target eNB includes a dedicated random access preamble allocated for the mobile terminal, the handover command sent by the source eNB at this time may also carry the dedicated random access preamble.

Because the source eNB has some relation with communications between the mobile terminal and the network side at this time, when there are communication data in the buffer of the source eNB which are sent or to be received by the mobile terminal, the source eNB will send the buffered communication data to the target eNB via an interface between the two eNBs, that is, an X2 interface, when sending the handover command. The buffered communication data enable the target eNB upload the communication data to an upper access gateway or issue the communication data to the mobile terminal after an RRC connection is successfully established between the mobile terminal and the target eNB.

In steps 410-412, a handover candidate eNB determines whether handover information corresponding to the mobile terminal has been received before the expiry of its timer, and if yes, the handover candidate eNB stops the timer, determines that the handover candidate eNB itself is a target eNB, and performs step 413; otherwise, the handover candidate eNB determines itself as a prepared eNB, reduces its resources reserved for the mobile terminal, and performs step 413.

In the embodiment, the mobile terminal will initiate a random access to the target eNB after receiving a handover command from the source eNB. If the handover command carries a dedicated random access preamble previously allocated by the target eNB for the mobile terminal, the mobile terminal will send the preamble to the target eNB in order to begin a random access. Therefore, if the handover candidate eNB receives from the mobile terminal the dedicated random access preamble before the expiry of its timer, it manifests that the handover candidate eNB is a target eNB.

If the source eNB has communication data in its buffer sent or to be received by the mobile terminal, the source eNB will send the buffered communication data to a target eNB after selecting the target eNB, which enables the target eNB send the communication data to the mobile terminal or to an upper access gateway after a successful access by the mobile terminal. Then, if a handover candidate eNB receives, before the expiry of its timer, the communication data from the source eNB, it also indicates that the handover candidate eNB is a target eNB.

Furthermore, in accordance with the embodiment, after selecting a target eNB, the source eNB may directly send a message to the target eNB for indicating that the eNB has been selected as a target eNB. The handover candidate eNB that has received such a message will decide that it itself is a target eNB.

As to a prepared eNB, neither the mobile terminal nor the source eNB will interact with it. So, if none of the above mentioned handover information has been received by a handover candidate eNB before the expiry of its timer, the handover candidate eNB can determine that it itself is a prepared eNB.

As a prepared eNB will not be accessed by a mobile terminal at the current time, there is no need to preserve all the resources previously reserved for the mobile terminal, but to appropriately reduce the amount of reserved resources in order to increase the available resources $C_a$ of the prepared eNB. In particular, it is assumed that the currently received handover request is the $n_{th}$ handover request received by the prepared eNB within a time interval, then the resources reserved for the mobile terminal at this handover request has changed to:

$$C_{rn}=C_n/w \qquad \text{Formula 4}$$

wherein $C_{rn}$ is the amount of reserved resources after reduction, $C_n$ is the resources reserved for the mobile terminal by the prepared eNB in the preceding step 406, and w is a resource reuse factor for indicating that a total number of w mobile terminals take the eNB as their prepared eNB and share the reserved resources of the prepared eNB. If the eNB is taken as a prepared eNB by N mobile terminals at the same time, and the resources required by each of the mobile terminals are $C_n$, the resources reserved by the eNB for the N users are (N/w)×$C_n$ when N is an integral multiple of w, or else are (N/w)×$C_n$+$C_n$. When N is not an integral multiple of w, the brackets in the above two formulas should be replaced by a function of rounding the variable down to the nearest integer. For example, if there are 7 mobile terminals (that is N=7) and if w=5, then 5 mobile terminals thereof share a portion of resources with a size of $C_n$, whereas the other two users share another portion of resources with a size of $C_n$. Here, w can be determined based on handover failure probability in the current wireless communication system and current cell load of a prepared eNB. More specifically, the greater handover failure probability which indicates more mobile terminals fail for handover, the greater probability of the prepared eNB to be selected as a target eNB and the smaller resource reuse factor w. On the other hand, the smaller handover failure probability, the greater resource reuse factor w. The greater current cell load of the prepared eNB, the fewer resources reserved for handover on the prepared eNB and the greater resource reuse factor w; and the smaller current cell load of the prepared eNB, the smaller resource reuse factor w and the more resources reserved for handover.

After the reduction of the amount of resources reserved for the mobile terminal, the resources reserved for handover on the prepared eNB $C_{ho}$ are updated to:

$$C_{ho} = \sum_{i=1}^{n-1} C_{ri} + C_{rn} \qquad \text{Formula 5}$$

It can be seen that the amount of resources for handover has been reduced to some extent. Accordingly, it is known from Formula 1 that the amount of available resources of the prepared eNB at the current moment $C_a$ has increased to some extent. Then, as a result of more adequate resources provided for the mobile terminal to access the prepared eNB, the handover success probability of the mobile terminal can be effectively improved in accordance with the embodiment of the present invention.

In steps 413-414, the mobile terminal randomly accesses the current target eNB, and determines whether the random access is successful or not, and if yes, performs step 417; otherwise, performs step 415.

In steps 415-416, the source eNB selects an eNB with the biggest RSRP as the current target eNB from prepared eNBs that have never been chosen, and sends to the mobile terminal a handover command including a cell ID of the target eNB, instructing the mobile terminal to access the current target eNB, and then returns to step 413.

If a random access to the previous target eNB by the mobile terminal is failed, the mobile terminal reestablishes an RRC connection with the source eNB. Since the source eNB has preserved user information of the mobile terminal, it can be determined that the return of the mobile terminal is a result of a handover failure, and then the RRC connection is reestablished. After that, the source eNB reselects a target eNB, and directly informs information of the new target eNB to the mobile terminal via a handover command to avoid that a target eNB selected by the mobile terminal itself is not a prepared eNB, and also to avoid the waste of reserved resources on prepared eNBs. The information of the new target eNB in this step may include a cell ID of the new target eNB, and may further include such as a dedicated random access preamble.

Since information related to handover candidate eNBs has been stored by the source eNB in step 407, the source eNB can search its local record to find a prepared eNB with the largest RSRP and has not been chosen as a target eNB before as the current target eNB. Obviously, the storage operation in step 407 can ensure that the source eNB need not notify the mobile terminal to do measurement again during a handover failure recovery procedure, and need not send handover request information to the handover candidate eNBs as well, thereby enabling the source eNB to reselect a target eNB more quickly.

Of course, if the mobile terminal has reported other received signal parameters in step 401, and the related information stored in step 407 also includes other received signal parameters, then it is not needed to select a target eNB in accordance with RSRP here. To sum up, the source eNB selects a target eNB which can provide the best receiving signals to the mobile terminal based on the received signal parameters.

Then the prepared eNB that has been selected as a target eNB need not adjust the reserved resources being reduced previously. The reasons are as follows: it can be seen from the above mentioned Formula 4 and Formula 5 that one portion of reserved resources of a prepared eNB are reused by a number of mobile terminals in an embodiment of the present invention; when the prepared eNB is selected as a target eNB and successfully accessed by a mobile terminal, the portion of reserved resources can be adapted for servicing the mobile terminal. If the prepared eNB is also acted as a target eNB of other mobile terminals at this time, its resources may be adjusted in order to be accessed by other mobile terminals.

In step 417, the current target eNB or the mobile terminal informs the source eNB that a random access is successful, and the source eNB will notify all the handover candidate eNBs other than the current target eNB to release the resources reserved for the mobile terminal.

After the mobile terminal has successfully got access to the current target eNB, the mobile terminal or the target eNB informs the source eNB about the handover success of the mobile terminal. The main purpose of this operation lies in the fact that the source eNB can cancel the wireless connectivity with the mobile terminal having performed a successful handover, and other prepared eNBs can release the resources reserved for the mobile terminal for other use. Here, the source eNB can inform the prepared eNB to release the reserved resources on its own initiative, or the prepared eNB can regularly inquire the source eNB whether to release the resources.

The handover processing procedure in this embodiment is so far completed.

It can be seen from the above processing procedure that a handover candidate eNB in accordance with the embodiment can determine whether the eNB itself is acted as a target eNB or a prepared eNB, and reduce the resources reserved for the mobile terminal when it is a prepared eNB. In this way, within a certain period of time from the mobile terminal starting for handover to completing a successful handover, the prepared eNB has on the one hand done enough preparations for the handover of the mobile terminal, and on the other hand increased the available resources as far as possible in order to provide protection for accesses of other mobile terminals. As a result, compared to an existing handover procedure, the handover success probability of the embodiment can be effectively improved.

Additionally, in the embodiment, the handover information corresponding to the mobile terminal is used as a basis by a handover candidate eNB for determining its role, wherein the handover information can be any one or any combination of the following: a dedicated random access preamble from the mobile terminal, or communication data from a source eNB, or a message from a source eNB for indicating that an eNB is selected as a target eNB. These forms of handover information are more common in the handover procedure, simple to be realized and can easily be processed.

To further enhance the resource utilization rate in a handover process, and to reduce the amount of reserved resources on a prepared eNB, a maximum number of prepared eNBs can be preset in accordance with an embodiment of the present invention based on service class of mobile terminals and stored in the source eNB in such as a form of Table 1.

TABLE 1 the corresponding relationship between service class and a maximum number of prepared eNBs

| service class | a maximum number of prepared eNBs |
|---|---|
| conversation class, lower delay | 2 |
| streaming class, low delay | 1 |
| interactive class, high delay | 0 |
| background class, higher delay | 0 |

In case that a maximum number of prepared eNBs is preset, before step 401 in FIG. 4, when an RRC connection is successfully established between the mobile terminal and the source eNB, the source eNB issues an RRC connection reconfiguration signaling to the mobile terminal for connecting a wireless bearer and obtaining service class of the mobile terminal; the mobile terminal completes its own configuration according to the received RRC connection reconfiguration signaling, and reports its service class information to the source eNB and specifies the completion of configuration; the source eNB finds, after obtaining the service class of the mobile terminal, the maximum number of prepared eNBs for this service class from the corresponding relationship between service class and a maximum number of prepared eNBs, and stores the maximum number of prepared eNBs together with the user information in the source eNB.

Since the maximum number of prepared eNBs assumed to be $N_{max}$ is set in the above, the source eNB will send out handover requests to ($N_{max}$+1) neighboring eNBs at most in step 403 when counting the target eNB in. Specifically, take RSRP as an example of a received signal parameter, the handover decision in step 402 includes the following steps:

Step 4021: arranging, by the source eNB, RSRPs of the neighboring cells reported by the mobile terminal in a descending order, and setting the number of selected neighboring eNBs N as 0;

Step 4022: determining whether an neighboring eNB with the largest RSRP satisfies a handover trigger condition; for example as to intra-frequency cells, whether a handover trigger condition is met; for example whether the RSRP amplitude of the current neighboring cell is a preset offset higher than that of the source eNB. If the condition is satisfied, it is determined that the mobile terminal needs to handover, then the eNB of the neighboring cell with an optimal received signal parameter is selected, the number of selected neighboring eNBs N is added by 1, and step 4023 is performed; otherwise, the handover processing procedure is ended;

Step 4023: determining whether the number of selected neighboring eNBs N is less than the maximum number of prepared eNBs $N_{max}$+1, and if so, performing step 4024; otherwise, performing step 403;

Step 4024: determining whether all the neighboring eNBs reported by the mobile terminal have been processed, and if so, performing step 403; otherwise, performing step 4025;

Step 4025: taking a next cell as the current cell, and judging whether the current cell meets a handover trigger condition, and if yes, selecting the neighboring eNB corresponding to the current cell, adding the number of selected neighboring eNBs by 1, and returning to step 4023; otherwise, returning to step 4024.

Accordingly, in step 403, the source eNB sends a handover request to a neighboring eNB corresponding to the selected cell.

In case that the maximum number of prepared eNBs is preset, the source eNB can selectively send a handover request to a neighboring eNB in accordance with the service class of the mobile terminal. Since the number of prepared eNBs is related to the service class, the prepared eNB and its reserved resources can not only better satisfy service needs of mobile terminals, but also avoid a low success rate caused by having too few prepared eNBs on the one hand and avoid a waste of resources caused by having too many prepared eNBs on the other hand.

Figure 5:
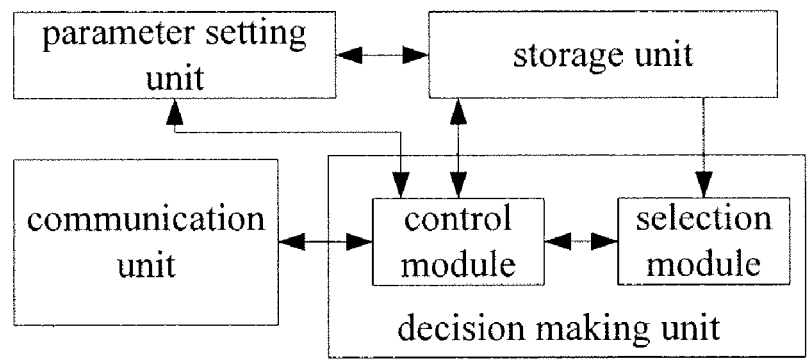
FIG. 5 is a diagram illustrating the structure of a source eNB in accordance with an embodiment of the present invention.

FIG. 5 is a diagram illustrating the structure of a source eNB in accordance with an embodiment of the present invention. As shown in FIG. 5, the source eNB includes: a communication unit and a decision making unit, wherein the communication unit is adapted for interacting with neighboring eNBs, notifying information of the neighboring eNBs that can be accessed by a mobile terminal to the decision making unit, and sending to the mobile terminal target eNB information provided by the decision making unit; the decision making unit is adapted for selecting a target eNB from the neighboring eNBs that can accept a handover request sent by the mobile terminal, and notifying the target eNB information to the communication unit.

The source eNB may also include a storage unit, adapted for storing information related to handover candidate eNBs.

The decision making unit includes a control module and a selection module. The control module is adapted for generating a handover request for at least one neighboring eNB, and instructing the communication unit to send the handover request to corresponding neighboring eNB; receiving a handover request acknowledge signal sent by an neighboring eNB via the communication unit, setting the neighboring eNB corresponding to the handover request acknowledge signal as a handover candidate eNB, sending information related to the handover candidate eNB to the storage unit and informing the selection module to select a target eNB; receiving from the selection module target eNB information, such as cell representation of the target eNB, generating a handover command carrying the target eNB information and instructing the communication unit to send the handover command to the mobile terminal; informing the selection module to reselect a target eNB after determining the handover of the mobile terminal is failed. If the target eNB has allocated a dedicated random access preamble for the mobile terminal, the handover command may further include the dedicated random access preamble.

The selection module is adapted for receiving from the control module a notification for selecting a target eNB, reading from the storage unit the information related to the handover candidate eNBs, selecting a target eNB from the handover candidate eNBs according to received signal parameters and/or user preferences, and setting the rest of the handover candidate eNBs as prepared eNBs; after receiving from the control module a notification for reselecting a target eNB, reselecting a target eNB from the prepared eNBs that have never been selected based on received signal parameters and/or user preferences; sending target eNB information to the control module after the selection of the target eNB.

Further, the control module is also adapted for generating measurement configuration information and instructing the communication unit to issue the measurement configuration information to the mobile terminal, receiving from the communication unit received signal parameters of adjacent cells reported by the mobile terminal; making a handover decision in accordance with the received signal parameters of the adjacent cells, determining that the mobile terminal needs to handover when a handover trigger condition is met, and continuing the operation of generating a handover request for at least one neighboring eNB. In addition, the control module is also adapted for receiving a random access preamble forwarded by the communication unit and allocated by a neighboring eNB for the mobile terminal, storing the random access preamble in the storage unit as one of the information of the handover candidate eNBs.

In addition, the storage unit is also adapted for buffering communication data sent or to be received by the mobile terminal. Then, the control module is adapted for reading the communication data from the storage unit after the selection of the target eNB, and instructing the communication unit to send the communication data to the target eNB; the communication unit is adapted for receiving the communication data sent from the control module, and then sending the communication data to the target eNB.

In addition, the control module can be adapted for generating, after the selection of target eNB, a message for indicating the eNB that it has been selected as a target eNB and sending the message to the communication unit; and the communication unit is adapted for sending the message to the target eNB.

The control module can further be adapted for generating a notification for releasing reserved resources after determining a success handover of the mobile terminal, and instructing the communication unit to send the notification to handover candidate eNBs other than the target eNB; the communication unit is adapted for informing the handover candidate eNBs other than the target eNB to release the resources reserved for the mobile terminal under the instruction of the control module.

In accordance with the embodiment of the present invention, the source eNB also includes a parameter setting unit, adapted for receiving service class information of the mobile terminal from the control module, reading from the storage unit the corresponding relationship between the service class and a maximum number of prepared eNBs to determine the maximum number of prepared eNBs corresponding to the mobile terminal, and sending the maximum number of prepared eNBs to the control module; the storage unit is also adapted for storing the preset corresponding relationship between service class and a maximum number of prepared eNBs as well as the maximum number of prepared eNBs corresponding to the mobile terminal; the control module is adapted for determining the service class information of the mobile terminal by analyzing an RRC connection reconfiguration signaling, receiving the maximum number of prepared eNBs corresponding to the mobile terminal from the parameter setting unit and informing the communication unit to send a handover request to (the maximum number of prepared eNBs plus 1) neighboring eNBs.

Figure 6:
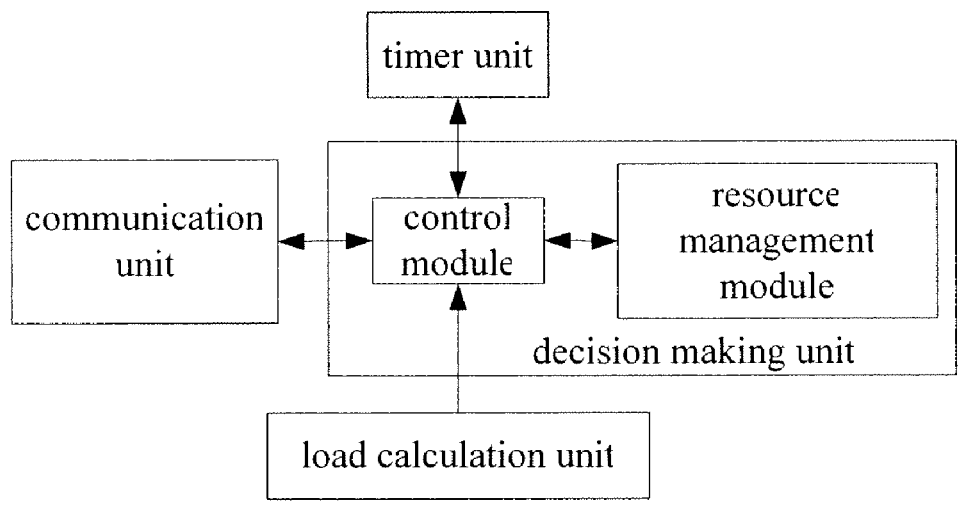
FIG. 6 illustrates the structure of a neighboring eNBs in an embodiment of the present invention.

The above mentioned is the structure of a source eNB in accordance with an embodiment of the present invention. FIG. 6 illustrates the structure of a neighboring eNBs in an embodiment of the present invention. As shown in FIG. 6, the neighboring eNB includes: a communication unit, a timer unit and a decision making unit. The communication unit is adapted for receiving handover information corresponding to a mobile terminal from the external; the timer unit is adapted for timing in accordance with a preset handover waiting time, and informing the decision making unit when the timer expires; the decision making unit is adapted for determining whether the neighboring eNB where the decision making unit locates receives the handover information corresponding to the mobile terminal within the preset handover waiting time, and if so, determining that the neighboring eNB is a target eNB and informing the communication unit to cooperate with the mobile terminal to handover the mobile terminal to the neighboring eNB itself; otherwise, determining that the neighboring eNB is a prepared eNB and reducing the amount of resources reserved for the mobile terminal.

The communication unit in accordance with the embodiment is further adapted for receiving a handover request from the source eNB, forwarding the handover request to the decision making unit, and sending to the source eNB, under the instruction of the decision making unit, a notification for indicating that the neighboring eNB the communication unit locates can accept the handover request of the mobile terminal.

Accordingly, the decision making unit includes a control module and a resource management module. The control module is adapted for receiving the handover request forwarded by the communication unit, obtaining the amount of resources of the neighboring eNB the control module locates from the resource management module, and after determining to accept the handover request of the mobile terminal in accordance with the handover request and the obtained amount of resources of the neighboring eNB, informing the resource management module to reserve resources for the mobile terminal, instructing the communication unit to send a handover request acknowledge signal to the source eNB, and also instructing the timer unit to start timing corresponding to the handover request; if the handover information corresponding to the mobile terminal is received by the control module before the expiry of the timer corresponding to the handover request, it is determined that the neighboring eNB the control module locates is a target eNB, and then the communication unit is informed to cooperate with the mobile terminal to perform a handover; otherwise, it is determined that the neighboring eNB the control module locates is a prepared eNB and the resource management module is notified to reduce resources reserved for the mobile terminal. Then, the resource management module informs the control module of the mount of resources of the neighboring eNB the control module locates, sets aside resources for the mobile terminal under the notification of the control module, thereby reducing the amount of resources reserved for the mobile terminal.

The neighboring eNB in accordance with the embodiment further includes a load calculation unit, adapted for calculating current cell load of the neighboring eNB, and sending the calculation result to the control module; the communication unit is further adapted for receiving handover failure probability from the external, and forwarding the handover failure probability to the control module; the control module is adapted for determining a resource reuse factor according to the received current cell load and the handover failure probability, and sending the resource reuse factor to the resource management module; the resource management module is adapted for adjusting the resources reserved for the mobile terminal to an amount equivalent to a quotient obtained by dividing the original reserved resources by the resource reuse factor after receiving a notification for indicating reduction of reserved resources.

Further, after determining that the handover request of the mobile terminal is acceptable, the control module allocates a dedicated random access preamble for the mobile terminal, and sends the preamble to the communication unit; the communication unit carries the dedicated random access preamble into a notification, and sends the notification to the source eNB, wherein the notification is for indicating that the neighboring eNB the communication unit locates can accept the handover request of the mobile terminal.

Furthermore, after determining that the neighboring eNB the control module locates is a target eNB, the control module instructs the communication unit to inform the source eNB of a random access success if the mobile terminal has successfully accessed the neighboring eNB. In addition, the communication module can also receive from the source eNB a notification for indicating a release of resources reserved for the mobile terminal, and forward the notification to the control module in the decision making unit; the control module informs the resource management module to release the resources reserved for the mobile terminal.

The above-mentioned source eNB and prepared eNB have little change to the existing structures, and therefore are easy to achieve and of low transform complexity.

Figure 7:
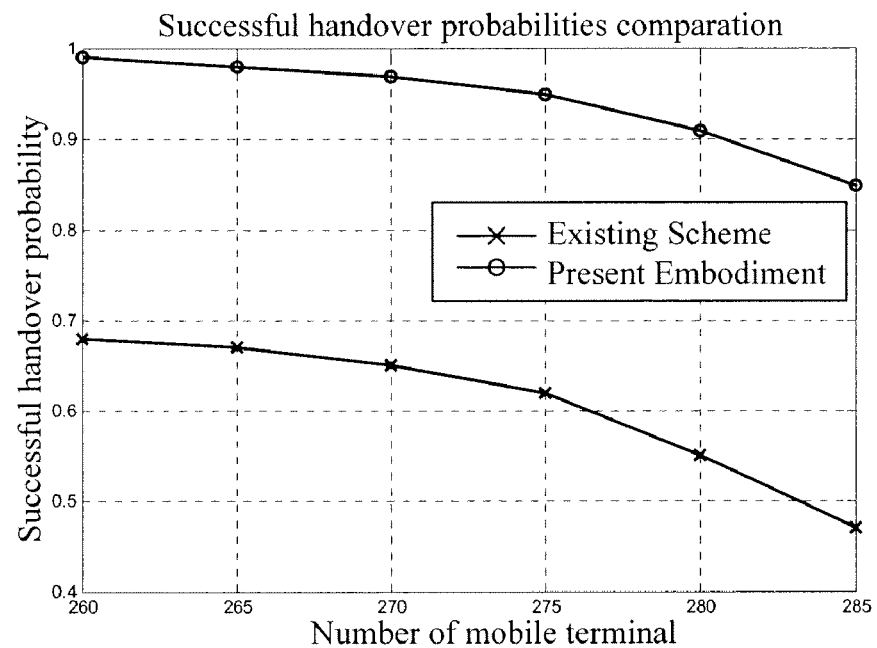
FIG. 7 is a diagram illustrating a simulation result of successful handover probabilities in both an existing handover processing approach and a handover processing approach shown in FIG. 4 of the present embodiment.

FIG. 7 is a diagram illustrating a simulation result of successful handover probabilities in both an existing handover processing approach and a handover processing approach shown in FIG. 4 of the present embodiment. It is assumed that the resource reuse factor is 5 in the simulation process, and all users have the same service class. The line with asterisks (*) represents the successful handover probability in the existing LTE handover processing approach, and the line with circles represents the successful handover probability in the handover processing approach shown in FIG. 4 of the present embodiment. It can be seen from FIG. 7 that, by using the handover processing approach shown in FIG. 4 of the present embodiment, the successful handover probability increases by about 20% than the existing approach.

Figure 8:
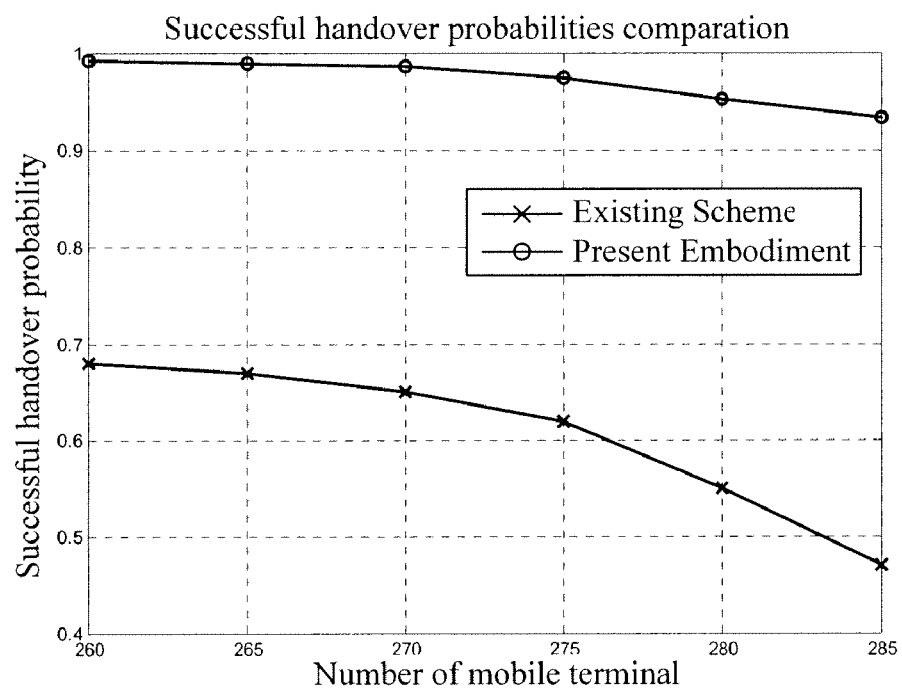
FIG. 8 shows a simulation result of successful handover probabilities in both an existing handover processing approach and a handover processing approach in the present embodiment that considers limiting the number of prepared eNBs.

FIG. 8 shows a simulation result of successful handover probabilities in both an existing handover processing approach and a handover processing approach in the present embodiment that considers limiting the number of prepared eNBs. The simulation parameters and lines representation are the same with FIG. 7. As can be seen from FIG. 8, when considering limiting the number of prepared eNBs, especially in case that there are a relatively large number of mobile terminals, the successful handover probability of the embodiment has a more great increase than that in the existing LTE handover processing approach.

The above is only preferred embodiments of the present invention and not to limit the present invention. Any changes, equivalent replacement and improvement within the spirit and principle of the present invention should be included within the protection scope of the present invention.

The invention claimed is:

1. A handover processing method, comprising:
   selecting, by a source eNB, a target eNB from neighboring eNBs that can accept a handover request from a mobile terminal, and notifying a selection result to the mobile terminal;
   if handover information corresponding to the mobile terminal is received by an neighboring eNB that can accept the handover request of the mobile terminal within a preset handover waiting time, determining, by the neighboring eNB, that it is a target eNB and cooperating with the mobile terminal to perform a handover; and otherwise, determining it is a prepared eNB by the neighboring eNB and reducing its resources reserved for the mobile terminal.

2. The method according to claim 1, wherein the handover information corresponding to the mobile terminal comprises any one of the following: a dedicated random access preamble sent by the mobile terminal, a message from the source eNB for indicating that an eNB is selected as the target eNB, and buffered data of the mobile terminal forwarded by the source eNB.

3. The method according to claim 1, further comprising:
setting a resource reuse factor according to one or both of handover failure probability and current cell load of the prepared eNB, before reducing its resources reserved for the mobile terminal; wherein
reducing its resources reserved for the mobile terminal comprises: adjusting the resources reserved for the mobile terminal to an amount equal to a quotient obtained by dividing original reserved resources by the resource reuse factor.

4. The method according to claim 2, further comprising:
setting a resource reuse factor according to one or both of handover failure probability and current cell load of the prepared eNB, before reducing its resources reserved for the mobile terminal; wherein
reducing its resources reserved for the mobile terminal comprises: adjusting the resources reserved for the mobile terminal to an amount equal to a quotient obtained by dividing original reserved resources by the resource reuse factor.

5. The method according to claim 1, further comprising:
setting, by the source eNB, the neighboring eNBs that can accept the handover request of the mobile terminal as a handover candidate eNBs, and storing information of the handover candidate eNBs, before selecting a target eNB from neighboring eNBs that can accept the handover request of the mobile terminal; and
after cooperating with the mobile terminal to perform a handover,
a1) determining whether the handover of the mobile terminal is successful, and if so, ending the handover processing procedure; otherwise, reselecting, by the source eNB, a target eNB from the handover candidate eNBs that have not yet been selected in accordance with the stored information of the handover candidate eNBs, informing the mobile terminal, and performing step a2;
a2) initiating a random access to the reselected target eNB by the mobile terminal, and returning to step a1.

6. The method according to claim 1, further comprising:
before the source eNB selects a target eNB from neighboring eNBs that can accept the handover request of the mobile terminal, sending, by the source eNB, the handover request to at least one neighboring eNB;
after determining that the handover request of the mobile terminal is acceptable according to the handover request and resources of the neighboring eNB, reserving, by an neighboring eNB that has received the handover request, resources for the mobile terminal, and sending out a handover request acknowledge signal to the source eNB;
taking, by the source eNB, the neighboring eNB corresponding to the handover request acknowledge signal as an neighboring eNB that can accept the handover request of the mobile terminal.

7. The method according to claim 6, further comprising:
presetting a corresponding relationship between a service class of mobile terminal and a maximum number of prepared eNBs;
before sending the handover request tout least one neighboring eNB,
b1) arranging, by the source eNB, the neighboring eNBs in a descending order in accordance with received signal parameters, and setting the number of selected neighboring eNBs as 0;
b2) when determining that the mobile terminal needs to handover and determining that the source eNB and the neighboring eNB with the best received signal parameters meet a handover trigger condition, selecting the neighboring eNB with the best received signal parameters, adding the number of selected neighboring eNBs by 1, and performing step b3;
b3) determining whether the number of selected neighboring eNBs is less than the maximum number of prepared eNBs plus 1, and if yes, performing step b4; otherwise, performing the step of sending the handover request to at least one neighboring eNB;
b4) determining whether all the neighboring eNBs, whose received signal parameters have been obtained by the source eNB, have been processed, and if so, performing the step of sending the handover request to at least one neighboring eNB; otherwise, performing step b5;
b5) taking a next neighboring eNB as the current neighboring eNB, and determining whether a handover trigger condition is met by the current neighboring eNB, and if yes, selecting the neighboring eNB, adding the number of selected neighboring eNBs by 1, and returning to step b3; otherwise, returning to step b4; wherein
sending the handover request to at least one neighboring eNB comprises: sending handover requests to the selected neighboring eNBs.

8. The method according to claim 5, further comprising:
after it is determined by the source eNB that the handover of the mobile terminal is successful, releasing, by all the handover candidate eNBs other than the target eNB, the resources of their own reserved for the mobile terminal.

9. A source eNB, comprising: a communication unit and a decision making unit, wherein the communication unit is adapted to interact with one or more neighboring eNBs, inform information of the neighboring eNBs that can accept a handover request of the mobile terminal to the decision making unit, and send the target eNB information obtained from the decision making unit to the mobile terminal; the decision making unit is adapted to select a target eNB from the neighboring eNBs that can accept the handover request of the mobile terminal, and inform information of the target eNB to the communication unit; a storage unit is to store the information of handover candidate eNBs; wherein the decision making unit comprises a control module and a selection module; wherein the control module is to receive handover request acknowledge signals of the neighboring eNBs forwarded by the communication unit, and take the neighboring eNBs corresponding to the handover request acknowledge signals as handover candidate eNBs, send the information of the handover candidate eNBs to the storage unit, and inform the selection module to select a target eNB; receive the information of the target eNB from the selection module, and instruct the communication unit to send the information of the target eNB to the mobile terminal; inform the selection module to reselect a target eNB after determining a handover failure of the mobile terminal;

the selection module is to read, after receiving from the control module the notification for selecting the target eNB, the information of the handover candidate eNBs from the storage unit, select a target eNB from the handover candidate eNBs according to received signal parameters and/or user preferences; after receiving from the control module a notification for reselecting a target eNB, reselect a target eNB from the handover candidate eNBs that have never been selected based on the received signal parameters and/or user preferences; send the information of the target eNB to the control module after the selection of the target eNB.

10. The source eNB according to claim 9, wherein the control module is further adapted to receive dedicated random access preambles allocated by the neighboring eNBs for the mobile terminal and forwarded by the communication unit, as one of the information of the handover candidate eNBs.

11. The source eNB according to claim 9, wherein the control module is further adapted to generate, after the target eNB is selected by the selection module, a message for indicating that an eNB is selected as the target eNB, and send the message to the communication unit; and
the communication unit is further adapted to send the message to the target eNB.

12. The source eNB according to claim 9, further comprising: a parameter setting unit, adapted to receive from the control module service class information of the mobile terminal, read from the storage unit corresponding relationships between service classes and maximum numbers of prepared eNBs, determine the maximum number of prepared eNBs corresponding to the mobile terminal, and send the maximum number of prepared eNBs to the control module; wherein
the storage unit is further adapted to store the preset corresponding relationships between service classes and maximum numbers of prepared eNBs as well as the maximum number of prepared eNBs corresponding to the mobile terminal;
the control module is further adapted to determine the service class information of the mobile terminal, receive the maximum number of prepared eNBs corresponding to the mobile terminal from the parameter setting unit, and inform the communication unit to send the handover request to neighboring eNBs with a number of the maximum number of prepared eNBs +1.

13. The source eNB according to claim 9, wherein the control module is further adapted to generate a notification of releasing reserved resources after determining the handover of the mobile terminal is successful, and instruct the communication unit to send the notification to the handover candidate eNBs other than the target eNB;
the communication unit is further adapted to inform, under the direction of the control unit, the handover candidate eNBs other than the target eNB to release the resources reserved for the mobile terminal.

14. An neighboring eNB of a source eNB, comprising: a communication unit, a timer unit and a decision making unit; wherein the communication unit is adapted for receiving from an external handover information corresponding to a mobile terminal; the timer unit is adapted for timing in accordance with a preset handover waiting time, and informing the decision making unit after a expiration of the timer; the decision making unit is adapted for determining whether the neighboring eNB where the decision making unit locates~has received handover information corresponding to the mobile terminal within the handover waiting time, and if so, determining that the neighboring eNB is a target eNB, and informing the communication unit to cooperate with the mobile terminal for performing a handover to the neighboring eNB; otherwise, determining that the neighboring eNB is a prepared eNB and reducing the amount of resources reserved for the mobile terminal.

15. The neighboring eNB according to claim 14, wherein the decision making unit comprises a control module and a resource management module; wherein the control module is adapted to inform, after determining that the handover request of the mobile terminal is acceptable, the resource management module to reserve resources for the mobile terminal, instruct the communication unit to send a handover request acknowledge signal to the source eNB, and instruct the timer unit to start a timer corresponding to the handover request; if the handover information corresponding to the mobile terminal has been received by the control module before the expiry of the timer corresponding to the handover request, determining that the neighboring eNB, where the decision making unit locates, is a target eNB and informing the communication unit to cooperate with the mobile terminal for performing a handover; otherwise, determining the neighboring eNB, where the decision making unit locates, is a prepared eNB and notifying the resource management module to reduce the resources reserved for the mobile terminal;
the resource management module is adapted to, under the notification of the control module, reserve resources for the mobile terminal as well as reduce the amount of resources reserved for the mobile terminal.

16. The neighboring eNB according to claim 15, further comprising a load calculation unit, adapted to calculate current cell load of the neighboring eNB the unit locates, and send the calculation result to the control module; wherein
the communication unit is further adapted to receive handover failure probability from the external, and forward it to the control module;
the control module is further adapted to determine a resource reuse factor in accordance with the received current cell load and handover failure probability, and send it to the resource management module;
the resource management module is adapted to adjust, upon receipt of the notification for reducing the reserved resources from the control module, the resources reserved for the mobile terminal to an amount equal to a quotient obtained by dividing the original reserved resources by the resource reuse factor.

17. The neighboring eNB according to claim 15, wherein the control module is further adapted to instruct, after determining that the neighboring eNB it locates is a target eNB, the communication unit to inform the source eNB of a random access success if the mobile terminal has successfully got access to the neighboring eNB.

18. The neighboring eNB according to claim 15, wherein the communication unit is further adapted to receive from the source eNB a notification for releasing the resources reserved for the mobile terminal and forward it to the decision making unit in the control module; and
the control module is adapted to inform the resource management module to release the resources reserved for the mobile terminal.

19. a network communication system, comprising: a source eNB and one or more neighboring eNBs, wherein the source eNB is adapted to select a target eNB from one or more neighboring eNBs that can accept a handover request of a mobile terminal, and notify the mobile terminal; if receiving handover information corresponding to the mobile terminal within a preset handover waiting time, the neighboring eNB determining itself as a target eNB, and cooperating with the mobile terminal to perform a handover; otherwise, the neighboring eNB determining itself as a prepared eNB, and reducing its own reserved resources for the mobile terminal.

* * * * *